(12) United States Patent
Feucht et al.

(10) Patent No.: US 7,785,151 B2
(45) Date of Patent: Aug. 31, 2010

(54) CONNECTION SYSTEM, IN PARTICULAR A PLUG-IN CONNECTION SYSTEM FOR THE TRANSMISSION OF DATA AND POWER SUPPLY SIGNALS

(75) Inventors: Wolfgang Feucht, Berlin (DE); Jörg Giebson, Satzkorn (DE)

(73) Assignee: Knick Elektronische Messgeraete GmbH & Co., KG, Berlin (DE)

( * ) Notice: Subject to any disclaimer, the term of this patent is extended or adjusted under 35 U.S.C. 154(b) by 605 days.

(21) Appl. No.: 11/671,700

(22) Filed: Feb. 6, 2007

(65) Prior Publication Data

US 2007/0183315 A1   Aug. 9, 2007

(30) Foreign Application Priority Data

Feb. 8, 2006   (DE) .................. 10 2006 005 633

(51) Int. Cl.
*H01R 33/00* (2006.01)
(52) U.S. Cl. .................. 439/660; 439/625; 439/950; 336/90
(58) Field of Classification Search .......... 439/557, 439/625, 626, 660, 950, 527, 544, 552; 336/90
See application file for complete search history.

(56) References Cited

U.S. PATENT DOCUMENTS

| | | | |
|---|---|---|---|
| 6,476,520 B1 * | 11/2002 | Bohm et al. | 307/104 |
| 6,705,898 B2 * | 3/2004 | Pechstein et al. | 439/660 |
| 2002/0105286 A1 * | 8/2002 | Brownell | 315/291 |
| 2005/0016540 A1 | 1/2005 | Jumpertz | |
| 2005/0194296 A1 | 9/2005 | Lin | |
| 2006/0254911 A1 * | 11/2006 | Lindmueller et al. | 204/424 |
| 2006/0293608 A1 * | 12/2006 | Rothman et al. | 600/545 |

FOREIGN PATENT DOCUMENTS

| | | |
|---|---|---|
| DE | 43 44 071 A1 | 7/1995 |
| DE | 195 40 854 A1 | 5/1997 |
| DE | 197 19 730 C1 | 10/1998 |
| DE | 100 55 090 A1 | 5/2002 |
| DE | 202 02 447 U1 | 7/2002 |
| DE | 20 2004 003918 | 6/2004 |
| EP | 0 607 438 B9 | 7/1994 |

* cited by examiner

*Primary Examiner*—Chi H Pham
*Assistant Examiner*—Weibin Huang
(74) *Attorney, Agent, or Firm*—McGlew and Tuttle, P.C.

(57) ABSTRACT

A connection system for the preferably contactless transmission of data and power supply signals between a sensor means and a base unit in a measuring and transmission system comprises a sensor-side and a base-side connection element. There is provided in at least one of the connection elements an optical diagnosis display unit for displaying state parameters within the measuring and transmission system.

18 Claims, 2 Drawing Sheets

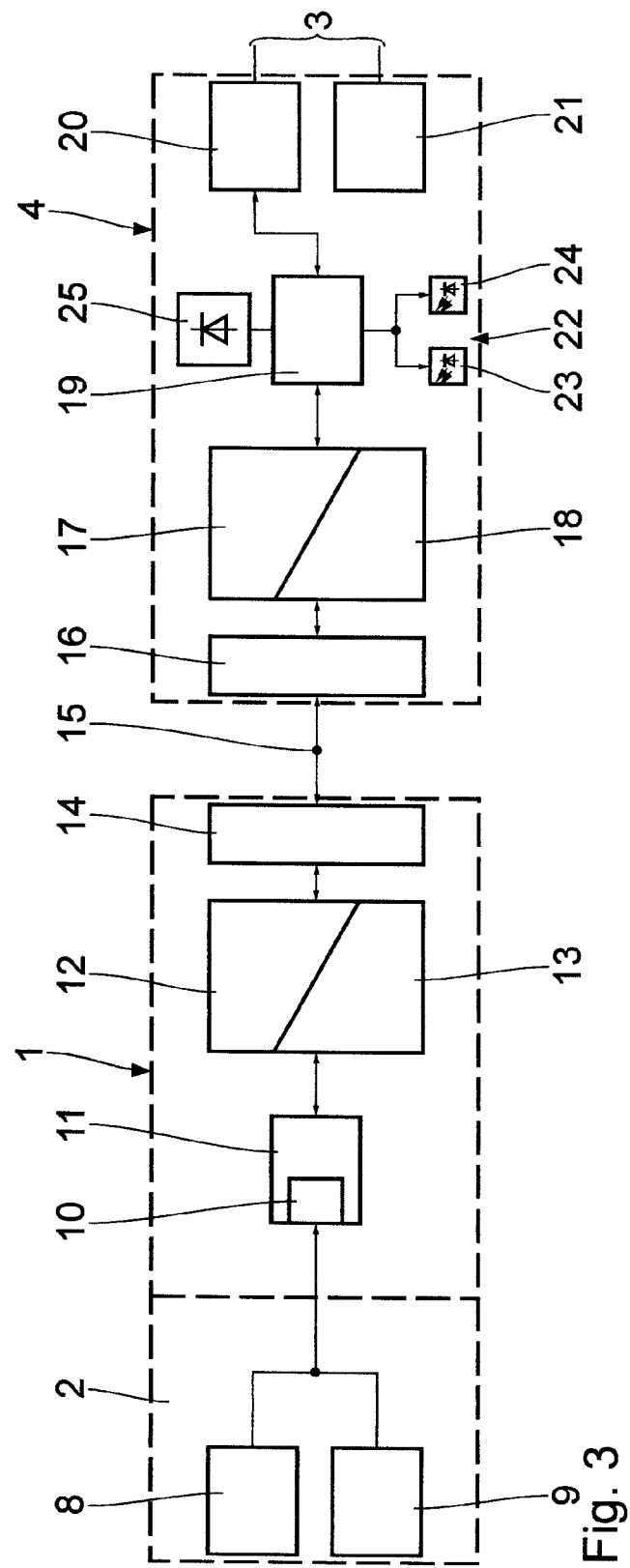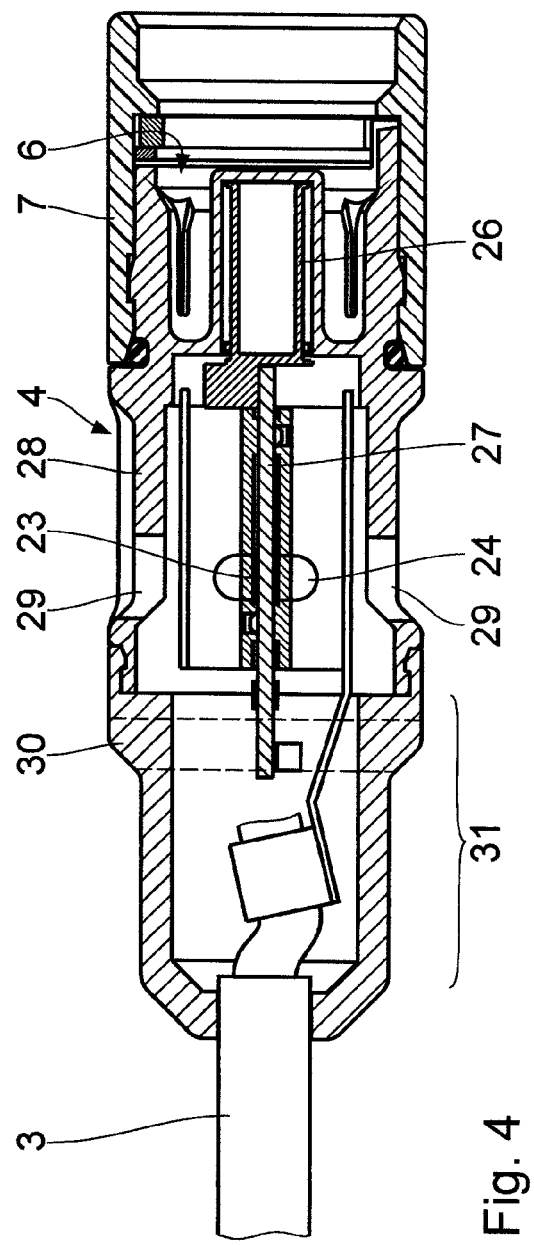
Fig. 3
Fig. 4

CONNECTION SYSTEM, IN PARTICULAR A PLUG-IN CONNECTION SYSTEM FOR THE TRANSMISSION OF DATA AND POWER SUPPLY SIGNALS

BACKGROUND OF THE INVENTION

1. Field of the Invention

The invention relates to a connection system, and in particular to a plug-in connection system for the preferably contactless transmission of data and power supply signals between a sensor means and a base unit in a measuring and transmission system. The term "connection system" as used in the present invention encompasses all possible coupling mechanisms which can be mechanically and electrically connected and isolated, plug connectors comprising a plug and socket element obviously being the most conventional examples of connectors of this type in electrical engineering. Such connectors may be configured in a directly contacting manner, but also in a contactless manner, for example inductively, capacitively or optically.

2. Background Art

The contactless transmission of switch signals and AC voltages in tele-communications and data transmission systems is known from DE 195 40 854 A1, for example, in the form of an electromagnetic multiple coupler. The non-contact and passive transmission means of the multiple coupler used in this case supersede plug-in connections and allow electrical isolation of the electrical signals between, for example, a telecommunications and data transmission engineering main device and an external operator device such as is to be used, for example, in fields of application in which there is a risk of explosions such as fuel depots, oil conveying plants and oil refining plants.

DE 100 55 090 A1 discloses a plug-in connection system for connecting a transmission line to a sensor, which system also operates in a contactless manner and is provided with plug-internal electronics. The signals are transmitted inductively, the transmitted signal comprising a supply voltage signal and measurement signal in superimposed form.

The closest prior art is represented by DE 197 19 730 C1 which also relates to a plug-in connection system for the contactless transmission of data and power supply signals between a sensor means and a base unit in a measuring and transmission system. In this case, a sensor means, for example for a temperature probe, is coupled to a sensor-side plug-in connection element. The sensor means has a certain "intelligence", as it has an A-D converter for the measurement signal of the thermocouple representing the measuring sensor and a microprocessor-assisted control and memory unit connected downstream thereof. In the sensor-side plug-in connection element, which is coupled to the sensor means, there is provided a data modulator/demodulator unit in combination with a power signal receiver, which unit is connected to a first coupling partner element of an inductive coupling for the contactless transmission of data and power supply signals. The second coupling partner element of the inductive coupling path is located in the base-side plug-in connection element which is linked, for the purposes of the supply of data and power, to the corresponding lines of a bus system. In this base-side plug-in connection element there is provided, again in combination, a data modulator/demodulator unit with a power signal transmitter, which unit powers the sensor system via the primary current supply originating from the bus system.

With regard to the invention, it should be noted that measuring and transmission systems of this type are often used in a harsh industrial environment such as, for example, in large-scale chemical processing plant. The measuring points are in such cases frequently far removed from the central control room. This gives rise to the problem that it is generally not possible for the process operators to discern on site at a measuring point whether the plug-in connection system is operating optimally, in particular whether the measuring and transmission system is in an appropriate operating state for the measurement variables to be picked off. It may be possible to query this only via the control room.

Starting herefrom, the object of the invention is to specify a connection system, and in particular a plug-in connection system for the preferably contactless transmission of data and power supply signals, wherein it can be discerned from the connection system itself whether the measuring and transmission system linked thereto is operating correctly.

SUMMARY OF THE INVENTION

This object is achieved by a connection system according to the invention comprising a sensor-side connection element with a power signal receiver, a data modulator/demodulator unit which can be coupled at least indirectly, for the purposes of signalling, to at least one measuring sensor of the sensor means, as well as a first coupling partner element for the preferably contactless transmission of data and power supply signals via a coupling path, a base-side connection element with a second coupling partner element of the coupling path, a power signal transmitter, a data modulator/demodulator unit, a data interface which can be connected to the base unit with respect to data, as well as a primary power supply, and a microprocessor-assisted control and memory unit in at least one of the connection elements, and in at least one of the connection elements an optical diagnosis display unit which displays defined state parameters within the measuring and transmission system. Examples of state parameters of this type include the voltage supply state, the data transmission behaviour or the state of the sensor of the measuring and transmission system. With regard to the monitoring of the state of the sensor and the displaying thereof, in particular, the connection system may be of "intelligent" configuration in such a way that it causes initiation of the test routines for determining the state of the sensor of its control and memory unit.

In principle, the optical diagnosis display unit can be based on one or more light-emitting diodes, wherein differing state parameters of the measuring and transmission system can be displayed by differing colouring and/or flash frequencies of the display signal. A plurality of light-emitting diodes, corresponding to the basic colours red, blue and green, may thus also be provided in the optical diagnosis display unit. These diodes can be activated, in accordance with the principle of the additive mixture of colours, to generate a display signal of any colour.

In the case of a pH measuring point, for example, the colour of the light-emitting diode module could be activated as a function of the measured hydrogen ion concentration. The optical diagnosis display unit can thus be based on what is known as the litmus test. If a low pH is measured, the optical diagnosis display unit is lit up red; if a high pH is measured, the unit is lit up blue.

Other optical displays such as, for example, LCD displays, which optionally output error or status codes or in the manner of plain-text messages, can also be used.

In a preferred development, the optical diagnosis display unit can also be used as an additional interface for optical data transmission. The visible light representing the display signal is therefore additionally amplitude, frequency or phase-modulated, so the data thus represented can be received and further evaluated using an additional device.

In a further preferred embodiment, the connection system can additionally be equipped with an interface for the wireless communication of data to a separate entity such as, for example, a PDA, MDA, PC laptop and the like. The interface may be in the form of a radio or infrared interface, infrared transmission (IrDA) displaying significant advantages, such as low power consumption, highly secure transmission of data through the direct optical transmission route and a simple connection construction, over radio solutions such as, for example, Bluetooth. Furthermore, an interface of this type is nowadays part of the basic equipment of many communications devices.

Preferred embodiments with regard to the positioning of the diagnosis display unit or the light-emitting diodes provide an arrangement on a printed circuit board arranged in the interior of the connection system, the display signal being discernible from the outside via windows in the housing of the connection system. A window of this type may preferably be an annular window provided in the sensor-remote housing portion of the connection system. The display signal of the diagnosis display unit is therefore visible both from all radial spatial directions and from behind if the connection system is mounted, for example, in what is known as a dip tube, thus obstructing any lateral view of the connector.

Further features, advantages and details of the subject-matter of the invention will emerge from the following description in which an embodiment is described in detail with reference to the appended drawings.

BRIEF DESCRIPTION OF THE DRAWINGS

FIG. 3 is a block diagram of the internal construction of the plug-in connection system, and FIG. 4 is an axial section of a socket element of the plug-in connection system.

DESCRIPTION OF THE PREFERRED EMBODIMENT

Figure 1:
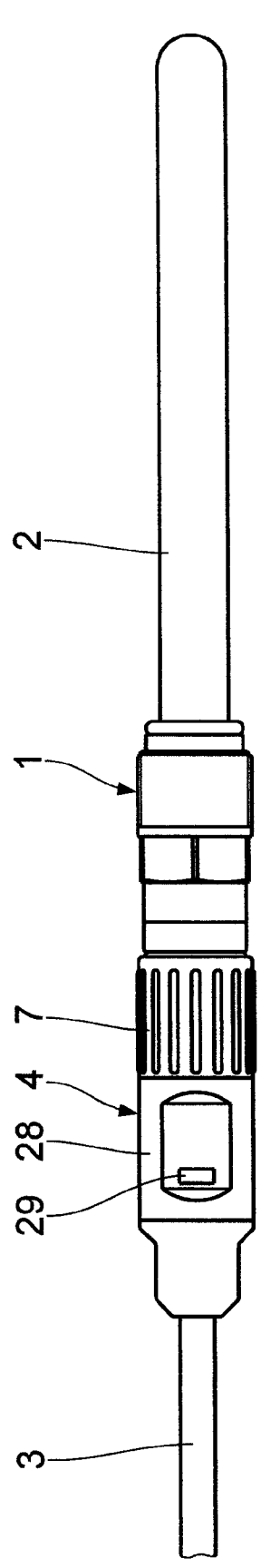
FIGS. 1 and 2 are side views of a plug-in connection system in the coupled and detached states.
Figure 2:
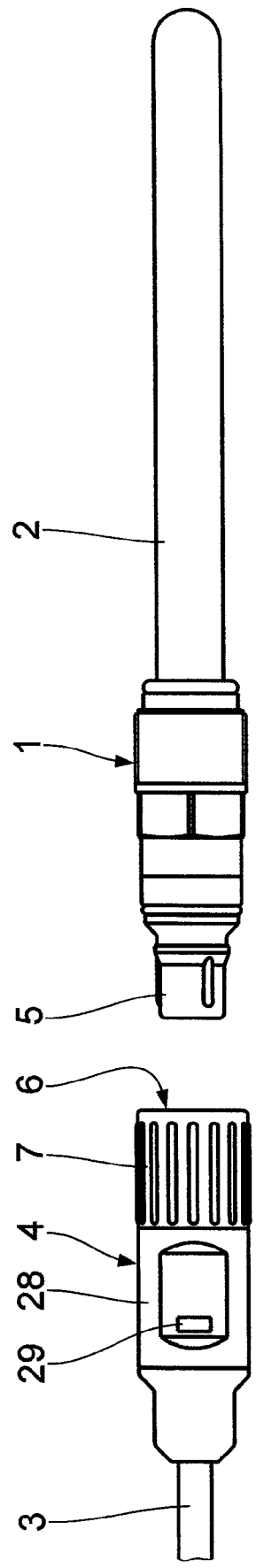

The plug-in connection system shown in FIGS. 1 and 2 comprises a sensor-side plug element 1 to which there is directly fastened a sensor means 2 shown schematically in the present case to be tubular. This means may, for example, be a pH probe comprising a temperature detection means, but also any other type of sensor such as, for example, an oxygen or conductivity probe. The sensor means 2 is positioned in this case in the process to be monitored. In order to forward the measurement data to a corresponding base unit, such as for example a field bus device, a data and supply line 3 is linked to the field bus device via the plug-in connection system according to the invention. The data line could in this case also be in the form of a two-wire bus line. The socket element 4, which comprises a recess 6, the shape of which is adapted to the plug-in portion 5 of the plug element 1, for mechanical and inductive coupling between the plug element 1 and socket element 2, cooperates in this case with the plug element 1. The engagement, which will not be described in detail, between the plug element 1 and the socket element 4 is cancelled by a release sleeve 7, thus allowing the plug-in connection system to be brought into the uncoupled position shown in FIG. 2.

FIGS. 3 and 4 show the functional construction of the plug-in connection system comprising the plug element 1 and the socket element 4. The sensor means 2 thus comprises, for example, an elementary sensor 8 for detecting a pH and/or a redox potential of a process liquid and an elementary sensor 9 for detecting the temperature of the process liquid. Both sensors 8, 9 supply a respective analogue voltage signal which is issued to the A-D converter 10 linked, for the purposes of signalling, to the plug element. The plug element is integrated into a microcontroller 11 which, as the central control and memory unit, is functionally responsible in a known manner for the basic controlling, the processing of command and measurement data and the forwarding thereof.

Also provided in the plug element 1 is circuitry comprising the power signal transmitter 12, data modulator/demodulator unit 13 and a first coupling partner element 14 for the inductive contactless coupling path 15 between the plug element 1 and socket element 4.

The second coupling partner element 16 is arranged at its head side on the socket element 4 and is connected to circuitry consisting of the power signal transmitter 17 and modulator/demodulator unit 18. In the socket element 4, as in the plug element 1, a microcontroller 19 takes over the central control and memory outputs in conjunction with the power supply and the data exchange of the plug-in connection system. The data is exchanged via an RS 485 modem, as the data interface 20, to a base unit (not shown in detail) such as, for example, a Profibus field device. Finally, the entire plug-in connection unit is powered via a primary current supply 21. The plug-in connection system as a whole, including the sensor means 2, is in compliance with the explosion prevention regulations.

Finally, there is provided in the socket element 4 an optical diagnosis display unit (denoted in its entirety by reference numeral 22) which is activated by the microcontroller 19 and comprises, in the embodiment shown in the present case, two light-emitting diodes 23, 24. These two light-emitting diodes 23, 24 are used in a manner to be discussed in detail hereinafter to display state parameters within the measuring and transmission system.

Before this is considered, the basic mode of operation of the plug-in connection system, such as is known per se from the prior art, will briefly be outlined. Starting from the sensor side, the analogue signals supplied by the two elementary sensors 8, 9 are digitised in the A-D converter 10. The microcontroller 11 calculates the corresponding measured values and outputs these to the portion of the circuit embodying the power signal receiver 12 and the modulator/demodulator unit 13. This portion of the circuit converts the digital information via the measured values into a modulation suitable for transmission via the inductive coupling path 15; examples of such modulation include amplitude, frequency or phase modulation. On the side of the socket element 4, the corresponding digital information is filtered out by the modulator/demodulator unit 18 and transmitted via the data interface 20 and the bus line 3 to a field device for further processing. The microcontroller 19 controls in this case the flow of data by switching, for example, the data interface 20 from Receive to Send.

For powering the plug-in connection system as a whole, the power signal transmitter 17 comprising the modulator/demodulator unit 18 is controlled in such a way, starting from the base-side primary current supply 21 via the microcontroller 19, that, in addition to modulated data signals used, for example, for parametrising the sensor means 2, power supply signals, i.e. for example a carrier voltage, are transmitted via the coupling path 15. The carrier voltage is processed by the power signal receiver 12 comprising the modulator/demodulator unit 13 in such a way that the components in the plug element 1 can be fully powered.

The core of the invention is the diagnosis display unit 22 which is controlled by the microcontroller 19 and serves as a status display for displaying state parameters at the plug-in connection system itself. Simple on-site diagnosis of the measuring system provided in the plug-in connection system is thus possible.

The orderly state of the power supply can thus be signalled, for example, by continuous illumination of the green light-emitting diode 23 and a drop in voltage or insufficient power supply as a result of this LED 23 being switched off. Correct data transmission within the plug-in connection system via the plug element 1 and socket element 4 and correct transmission of data between the plug-in connection system itself and the field device, as the superordinate base unit, can be signalled by flashing of the green light-emitting diode 23. Defective transmission of data between the communication partners described can, for example, be represented by continuous or flashing illumination of the red light-emitting diode 24.

Further state parameters which can be displayed include, for example, the status of the sensor. For this purpose, the plug element contains means for monitoring operation. In the case of ion-sensitive sensors, for example, which generally consist of a high-resistance measuring electrode and a relatively low-resistance reference electrode, the internal resistance of the electrode is accordingly measured by superimposing test voltages on the DC measurement signals themselves. The impedance of the high-resistance measuring electrode or the reference electrode can be calculated from the relationship between the output voltage and test voltage. This calculation can be carried out by the microcontrollers 11 and 19 in the plug-in connection system itself or in a separate base unit such as the field device. If the calculated internal resistance exceeds or falls below defined limits, this is an indication that an error has occurred in one of the electrodes. This check is generally carried out in the field device which, in the event of an error, generates a corresponding error message and forwards the message to the socket element 4 of the plug-in connection system via the data interface 20. The microcontroller 19 of the plug-in connection system is then able to activate the red light-emitting diode 24. Differing causes of error, such as disturbance of the data transmission or electrode errors, can then be visually represented by differing flash frequencies of the light-emitting diode 24.

Errors and/or diagnosis limits can also be checked directly in the plug-in connection system via the microcontrollers 11, 19 thereof. The plug-in connection system is thus able to generate error messages independently of the field device and also to display the messages by means of the light-emitting diodes 23, 24.

Moreover, the light-emitting diodes 23, 24 can also be used for transmitting information data. For this purpose, the diodes are activated by the microcontroller 19 in such a way that the visible LED light is additionally modulated for the transmission of data. Examples of the form of modulation include, again, amplitude, frequency or phase modulation. This data can then be extracted from the LED signal and further evaluated using an additional device.

Finally, FIG. 3 shows in the socket element 4 a further separate data interface 25 in the form of an IrDA infrared interface.

The inner mechanical construction of the socket element 4 will be described with reference to FIG. 4. The second coupling partner element 16, in the form of an indicated induction coil 26, is thus configured as the core of the annular recess 6 for the plug-in portion 5. When the plug-in portion 5 is plugged in, a corresponding annular coil in the head of the plug-in portion 5 comes to lie radially outside the induction coil 26, thus forming the coupling path 15.

The electronic components of the socket element 4, as were described with reference to FIG. 3, are arranged on a central printed circuit board 27 in the housing 28 of the socket element 4. These components also include the two light-emitting diodes 23, 24, the light signals of which may be seen via the window 29 in the housing 28 of the socket element 4. The transmission of light between the LEDs 23, 24 and the window 29 can be improved via optical waveguides (not illustrated in detail) in the form, for example, of Y-shaped plastics material bodies. In general, it must be ensured that all of the light-emitting components in the socket element 4 facilitate an exchange of light or radiation via corresponding windows in the housing 28. Indicated by broken lines in FIG. 4, by way of example, is an annular window 30 in the rear housing portion 31, via which window the light from light-emitting diodes (not illustrated in detail) can be irradiated in all radial directions.

What is claimed is:

1. A plug-in connection system for a contactless transmission of data and power supply signals between a sensor means and a base unit in a measuring and transmission system, the plug-in connection system comprising:
   a data and power supply line connected to the base unit;
   a sensor-side connection element, the sensor means being mounted to said sensor-side connection element, said sensor-side connection element comprising a power signal receiver, a data modulator/demodulator unit which can be coupled at least indirectly, for the purposes of signaling, to at least one measuring sensor of the sensor means and said sensor-side connection element comprising a first coupling partner element for contactless transmission of data and power supply signals via a coupling path;
   a base-side connection element coupled to said data and supply line, said base-side connection element comprising a second coupling partner element of the coupling path, a power signal transmitter, a data modulator/demodulator unit, a data interface which can be connected to the base unit with respect to data and a primary power supply;
   a microprocessor-assisted control and memory unit in at least one of the connection elements; and
   an optical diagnosis display unit in at least one of the connection elements for displaying state parameters within the measuring and transmission system, said optical diagnosis display unit comprising at least one light-emitting diode, wherein the at least one light-emitting diode of the optical diagnosis display unit is located on a printed circuit board arranged in an interior of the connection system and the display signal is discernible from outside via windows in the housing of the connection system.

2. A connection system according to claim 1, wherein the optical diagnosis display unit generates a signal representing the power supply state of the measuring and transmission system.

3. A connection system according to claim 1, wherein the optical diagnosis display unit generates a signal representing the data transmission behavior of the measuring and transmission system.

4. A connection system according to claim 1, wherein the optical diagnosis display unit generates a signal representing the state of the sensor of the measuring and transmission system.

5. A connection system according to claim 4, wherein the test routines for determining the state of the sensor can be initiated by the control and memory unit of one of the connection elements.

6. A connection system according to claim 1, wherein differing state parameters of the measuring and transmission system can be displayed by differing coloring and/or flash frequency of the display signal of the diagnosis display unit.

7. A connection system according to claim 1, wherein a plurality of light-emitting diodes are provided in said optical diagnosis display unit, said plurality of light-emitting diodes corresponding to the basic colors and being activated in accordance with the principle of the additive mixture of colors for generating a display signal of any color.

8. A connection system according to claim 1, wherein the display signal of the optical diagnosis display unit can additionally be modulated for optical data transmission.

9. A connection system according to claim 1, further comprising another interface for the wireless communication of data to a separate entity.

10. A connection system according to claim 1, wherein a window is provided, said window being an annular window in the sensor-remote housing portion of the connection system.

11. A connection system according to claim 1, wherein for configuring the connection system as a plug-in connection system, the sensor-side connection element is a plug element and the sensor-remote connection element is a socket element or vice versa.

12. A connection system according to claim 1, wherein the sensor-side connection element and the sensor means are rigidly connected to each other.

13. A connection system according to claim 1, wherein there is provided in the sensor-side connection element, for digitizing the measurement signal, an A-D converter coupled to the at least one measuring sensor for the purposes of signaling.

14. A connection system, in particular a plug-in connection system for contactless transmission of data and power supply signals between a sensor means and a base unit in a measuring and transmission system, the connection system comprising:
   a sensor-side connection element comprising a power signal receiver, a data modulator/demodulator unit which can be coupled at least indirectly, for the purposes of signaling, to at least one measuring sensor of the sensor means and said sensor-side connection element comprising a first coupling partner element for contactless transmission of data and power supply signals via a coupling path;
   a base-side connection element comprising a second coupling partner element of the coupling path, a power signal transmitter, a data modulator/demodulator unit, a data interface which can be connected to the base unit with respect to data and a primary power supply;
   a microprocessor-assisted control and memory unit in at least one of the connection elements; and
   an optical diagnosis display unit in at least one of the connection elements for displaying state parameters within the measuring and transmission system, said optical diagnosis display unit comprising at least one light-emitting diode, wherein the at least one light-emitting diode of the optical diagnosis display unit is located on a printed circuit board arranged in an interior of the connection system and the display signal is discernible from outside via windows in the housing of the connection system.

15. A connection system according to claim 14, wherein the window provided is an annular window in the sensor-remote housing portion of the connection system.

16. A connection system, in particular a plug-in connection system for contactless transmission of data and power supply signals between a sensor means and a base unit in a measuring and transmission system, the connection system comprising:
   a sensor-side connection element comprising a power signal receiver, a data modulator/demodulator unit which can be coupled at least indirectly, for the purposes of signaling, to at least one measuring sensor of the sensor means and said sensor-side connection element comprising a first coupling partner element for contactless transmission of data and power supply signals via a coupling path;
   a base-side connection element comprising a second coupling partner element of the coupling path, a power signal transmitter, a data modulator/demodulator unit, a data interface which can be connected to the base unit with respect to data and a primary power supply;
   a first microprocessor-supported control and memory unit provided in said sensor-side connection element;
   a second microprocessor-supported control and memory unit provided in said base-side connection element; and
   an optical diagnosis display unit in at least one of the connection elements for displaying state parameters within the measuring and transmission system.

17. A plug-in connection system for a contactless transmission of data and power supply signals between a sensor means and a base unit in a measuring and transmission system, the plug-in connection system comprising:
   a data and power supply line connected to the base unit;
   a sensor-side connection element, the sensor means being mounted to said sensor-side connection element, said sensor-side connection element comprising a power signal receiver, a data modulator/demodulator unit which can be coupled at least indirectly, for the purposes of signaling, to at least one measuring sensor of the sensor means and said sensor-side connection element comprising a first coupling partner element for contactless transmission of data and power supply signals via a coupling path;
   a base-side connection element coupled to said data and supply line, said base-side connection element comprising a second coupling partner element of the coupling path, a power signal transmitter, a data modulator/demodulator unit, a data interface which can be connected to the base unit with respect to data and a primary power supply;
   a microprocessor-assisted control and memory unit in at least one of the connection elements; and
   an optical diagnosis display unit in at least one of the connection elements for displaying state parameters within the measuring and transmission system, said optical diagnosis display unit comprising at least one light-emitting diode, wherein the at least one light-emitting diode of the optical diagnosis display unit is located on a printed circuit board arranged in an interior of the connection system and the display signal is discernible from outside via windows in the housing of the connection system, wherein at least one of the windows provided is an annular window in the sensor-remote housing portion of the connection system.

18. A plug-in connection system for a contactless transmission of data and power supply signals between a sensor means and a base unit in a measuring and transmission system, the plug-in connection system comprising:

a data and power supply line connected to the base unit;

a sensor-side connection element, the sensor means being mounted to said sensor-side connection element, said sensor-side connection element comprising a power signal receiver, a data modulator/demodulator unit which can be coupled at least indirectly, for the purposes of signaling, to at least one measuring sensor of the sensor means and said sensor-side connection element comprising a first coupling partner element for contactless transmission of data and power supply signals via a coupling path;

a base-side connection element coupled to said data and supply line, said base-side connection element comprising a second coupling partner element of the coupling path, a power signal transmitter, a data modulator/demodulator unit, a data interface which can be connected to the base unit with respect to data and a primary power supply;

a microprocessor-assisted control and memory unit in at least one of the connection elements; and an optical diagnosis display unit in at least one of the connection elements for displaying state parameters within the measuring and transmission system, wherein a microprocessor-supported control and memory unit is provided in both connection elements.

* * * * *